United States Patent [19]

Brown

[11] Patent Number: 5,461,709
[45] Date of Patent: Oct. 24, 1995

[54] 3D INPUT SYSTEM FOR CAD SYSTEMS

[75] Inventor: Robert J. Brown, Madison, Ala.

[73] Assignee: Intergraph Corporation, Huntsville, Ala.

[21] Appl. No.: 24,239

[22] Filed: Feb. 26, 1993

[51] Int. Cl.$^6$ .................................................... G06F 9/38
[52] U.S. Cl. ........................................... 395/155; 395/157
[58] Field of Search ................................... 395/155–161; 345/157, 158, 159

[56] References Cited

U.S. PATENT DOCUMENTS

| | | | |
|---|---|---|---|
| 4,812,829 | 3/1989 | Ebina et al. | 345/159 |
| 4,835,528 | 5/1989 | Flinchbaugh | 345/159 |
| 4,987,527 | 1/1991 | Hamada et al. | 345/157 |
| 5,181,181 | 1/1993 | Glynn | 345/163 |
| 5,264,836 | 11/1993 | Rubin | 345/157 |

*Primary Examiner*—Mark R. Powell
*Assistant Examiner*—Huynh Ba

*Attorney, Agent, or Firm*—Bromberg & Sunstein

[57] ABSTRACT

A system for supplying input data establishes the location of data points in a model space represented in a view of a two-dimensional display. In one embodiment, the system has a pointing device (such as a mouse) for establishing the location of a cursor on the display, and also an arrangement for establishing in the model space primary and secondary orientation planes of which one is currently active at any given time. The embodiment also has an arrangement for providing an initial value (called the "start point") of a tentative point in the model space. A dynamic arrangement establishes a current point in a construction plane, parallel to the active plane, in which the tentative point is located, in the location attributable to the position of the cursor on the display of the view. On command (typically when the cursor is in a desired position) a tentative selection arrangement copies the current point data to the tentative point data and toggles the active plane from one to the other of the primary and secondary planes. On command, typically when the user is satisfied with the location of the tentative point, a final selection arrangement provides input point data using the data of the tentative point.

21 Claims, 8 Drawing Sheets

5,461,709

3D INPUT SYSTEM FOR CAD SYSTEMS

FIELD OF THE INVENTION

The present invention relates to three-dimensional computer aided design (3D CAD) systems, and in particular to arrangements for providing input data for 3D CAD systems.

BACKGROUND ART

One of the most fundamental aspects of CAD systems is how the user places data points. To draw a line, for instance, the user must tell the system the location of the two endpoints of that line.

If there is already a feature (such as the endpoint of another line) at the point desired, most systems allow the user to "snap" to such a point. Many even allow sophisticated constructions based on existing features, such as finding the point at which a line and a circular arc intersect. In such cases, present systems are considered sufficient and no improvement is provided by the invention.

When there is no existing feature to snap to, other methods must be used. The most primitive method is for the user to type in the coordinates of the point. In a 2D system, these will generally be expressed in X and Y values, using a traditional Cartesian coordinate system, but there are many other variations. Regardless, this system is very slow and awkward for the user, unless his design has already been drawn on paper.

A more natural way to place a point is to use "graphic input," in which the point is determined by the position of the mouse cursor (or another pointing device). This is much more akin to traditional drawing. Most current systems enhance this system through "dynamics," otherwise known as "rubberbanding" or "cursor following." For instance, if the user has given the first point of a line, the system will display a dynamically adjusting line from that point to the cursor position, appearing to stretch like a rubber band as the user moves the mouse. This additional feedback to the user helps to let the user know what the result of placing a point will be prior to actually placing it. When the user presses a button on the mouse, the point will be placed, fixing the line in position.

One problem with this system is one of accuracy. CAD systems store coordinates with a high degree of precision, while the mouse cursor is no more precise than the screen resolution. This makes points input in such a way unacceptable for most mechanical or architectural design. The use of even-unit roundoff, similar to drawing on graph paper, can partially alleviate this problem.

In a 3D system the problem of point input is much more complex. Because the mouse cursor is inherently two-dimensional, there must be an additional method of specifying the "depth" of the point. There are various ways of dealing with this, such as allowing the user to preset a working depth, but these solutions tend to have both the lack-of-precision problems associated with cursor input, and the awkwardness and lack of interactivity associated with keying in coordinates. Furthermore, most such systems force the user to have multiple views of his design visible at once (such as a top, front and side view), which wastes valuable screen space as well as being an unnatural way to view an object. The user tends to go back to the primitive method of keying in X, Y, and Z coordinates, tedious as it may be.

Thus, there is a continuing need for improvements in 3D input systems for computer aided design systems in view of the problems with prior art systems.

SUMMARY OF INVENTION

The invention provides in one embodiment a system for supplying input data establishing the location of data points in a model space represented in a view on a two-dimensional display. The embodiment has a pointing device (such as a mouse) for establishing the location of a cursor on the display, and also an arrangement for establishing in the model space primary and secondary orientation planes of which one is currently active at any given time. The embodiment also has an arrangement for providing an initial value (called the "start point") of a tentative point in the model space. A dynamic arrangement establishes a current point in a construction plane, parallel to the active plane, in which the tentative point is located, in the location attributable to the position of the cursor on the display of the view. On command (typically when the cursor is in a desired position) a tentative selection arrangement copies the current point data to the tentative point data and toggles the active plane from one to the other of the primary and secondary planes. (In this manner, the tentative point may be established in a train of successive locations, each time by reference to a well-defined construction plane.) On command, typically when the user is satisfied with the location of the tentative point, a final selection arrangement provides input point data using the data of the tentative point.

In a further embodiment, the system has an arrangement for displaying the current point in the view as at the corner of a parallelepiped (sometimes called a "cuboid" in this description), the opposing corner of which is the start point. The parallelepiped has a pair of opposing sides parallel to each of the two orientation planes, so that the end of the parallelepiped that includes the current point is disposed in the construction plane. The construction plane may be shown by highlighting the end of the parallelepiped.

In these embodiments, the dynamic arrangement typically fixes the location of the current point in the construction plane in the location fixed by the position of the cursor on the display of view. However, in a further embodiment, the system may have a precision snap mode permitting entry of a precision point, and in this case, where the orientation planes are orthogonal, the current point is the normal projection of the precision point onto the construction plane.

In a further embodiment, an indexing arrangement forces the current point to have one coordinate value identical to the value of the corresponding coordinate of an index point if the current point's non-forced value of such coordinate falls within a specified limit of the value of the index coordinate.

BRIEF DESCRIPTION OF THE DRAWINGS

The foregoing aspects of the invention will be more readily understood by reference to the following description, taken with the accompanying drawings, in which.

DETAILED DESCRIPTION OF THE SPECIFIC EMBODIMENTS

Figure 1:
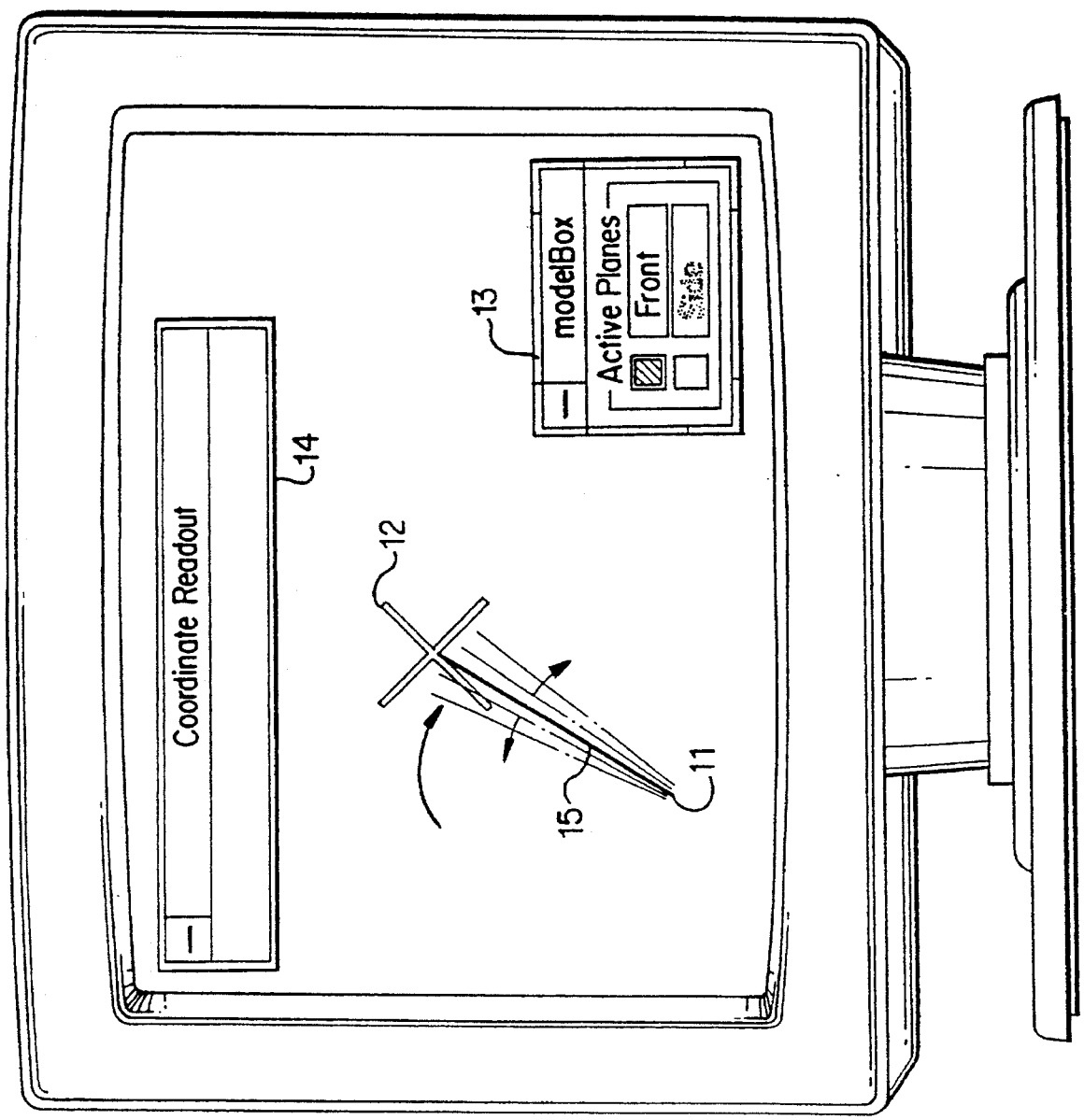
FIG. 1 shows the operation of a typical CAD system in a line draw command prior to activation of the 3D input mode.

The present invention provides in a preferred embodiment a sophisticated drawing aid which the user can activate when needed. If he can snap to a feature to place a point, there is no need to use this system. Otherwise, the system of the invention can be called into action. In a preferred embodiment, the invention applies a flexible and powerful constraint system to the interpretation of the cursor position, providing functionality analogous to a draftsman's T-square, triangle and ruler, but in three dimensions. Further, it fully exploits the previously mentioned "dynamics" to provide extensive feedback to the user as to the position of the point he will place. The position of the point in space is immediately clear even with a single view of the design.

A distinctive feature of the embodiment is the dynamic display of a 3D rectangular box to clearly convey to the user the location of a data point to be placed, with reference to any other point. One corner of the box will be a known "reference point" such as the last point placed, or any feature the user selects by snapping. The other corner of the box always will appear directly under the cursor. As the user moves the cursor, the box will change size in two dimensions (for instance, length and height), while the third (width) remains fixed, meanwhile maintaining one corner of the box under the cursor. When the user presses a mouse button, the point is registered tentatively, and the box length is fixed while the width is freed. The user can then adjust the size of the box by width and height. He can continue to tap points until satisfied with the length, width and height of the box, and hence the position of the data point. He can then accept the point by pressing another button, such as the Enter key on the keyboard.

While the above described arrangement allows the ability to place a point anywhere in 3D space, it does not provide for the precision necessary for most design work. Therefore a preferred embodiment of the system provides axis indexing and locking, snapping to other features while the system is active, user definable unit roundoff relative to the last point, and the acceptance of keyed in distances.

A well built CAD system is event-driven, that is, it is designed around responding to various user events. Such events might be pressing an on-screen button, typing in a number, pressing the mouse button, or simply moving the mouse. The system must respond appropriately to these events, depending on the context. Internally, the system accomplishes this by keeping track of which routine, if any, in the program to call for each possible event.

In the C language, these routines are called functions, and the system saves pointers (a pointer is a variable which stores an address in memory) to these functions. Those skilled in the art of CAD software development will be familiar with the use of function pointers to create an event-driven environment.

Typical CAD commands require the user to enter one or more data points. Such a command will be written so that the system will call a particular function if the user enters a data point, and this is known as the "data point function". The function will be called whether the user enters the data point by simply pressing the mouse button, by snapping, or by keying in the coordinates. The function will perform duties like saving the data point information, drawing elements on the screen, and resetting the function pointers to the next function in the command, until the command is complete.

Another kind of function is the "dynamics function." A dynamics function, called each time the mouse is moved, is responsible for the rubberbanding effect common in CAD systems. The dynamics function typically performs the function of displaying elements on the screen, based upon the current position of the mouse. The system must also provide a means to erase previously drawn elements.

Definitions:

Many terms used here should be familiar to those familiar to descriptive geometry or computer graphics. Many of the terms have subtle differences in meaning depending upon context: for instance, to a graphics programmer a "data point" can indicate a variable which stores the location of a point in memory, while to a CAD user it may represent the action of pressing the mouse button to supply such a point.

CAD: computer aided design. CAD software allows designers and draftsmen to interactively create "drawings" or "models" of parts, buildings, etc. These drawings or models are stored in the computer in a design file.

Design file: The computer file created by a CAD program. These files can be either two-dimensional (2d) or three-dimensional (3d). The contents of a 2d file is often referred to as a "drawing"; for a 3d file, a "model". The design file is generally structured as a list of individual elements.

Element: The smallest unit of a design file. Elements can be simple geometrical entities such as line segments, circles, and arcs, or more complex ones like dimensions, bspline curves and surfaces, or groups of simple elements. In addition to their geometrical information they contain information about how they are to be displayed, such as their color. The creation and manipulation of elements by the user is what occupies the bulk of a CAD user's time.

Command: Commands are the basic tools available to the user in a typical CAD program. These include commands to create new elements (place line, place circle), and modify existing ones (move element, rotate element), plus miscellaneous utility and viewing commands. The user can activate the command by various methods: keying in the name of the command or pressing an on-screen "button" are two common methods. The command will prompt the user for input ("Enter first point", "Key in radius") and display the results along the way. Good graphical interfaces allow various options to be manipulated without requiring the user to explicitly answer a prompt. A typical command will require the user respond to several prompts by keying in numbers, picking elements in the file, and entering data points.

Data point (or "point"): used to define a position (location) in a CAD program. In 2d, this can be thought of as a position on a plane, and is composed of two quantities (real numbers), typically an X and a Y. In 3d, it represents a position in space, and is composed of three quantities, typically X, Y, and Z. The accuracy with which these quantities are stored determines the accuracy of the CAD system.

Orientation (or "rotation angle"): in 2d, this can be referred to simply as "angle" and stored as a single quantity. In 3d, three quantities must be used to fully define an orientation. For instance, in 2d the minimum definition for an rectangle is five quantities: its center point (x and y), its length, its width, and its orientation (note that this is less than the 8 quantities required to store all four corners). In 3d, eight quantities are required (center x, y, and z, length, width, and the 3 aspects of 3d orientation), again, less than the 12 required to store all four corner points. Various data arrangements can used to store such 3d orientations, such as rotation matrices and quaternions.

View: Since CAD systems have a much higher accuracy than the screen, they display the information in one or more "views" often referred to loosely as "windows" The user can change a view's magnification (scale), centering (translation), and rotation (orientation). This allows the user to zoom in on a particular detail, or, in 3d, the user can rotate the view so that the design is shown from any direction.

The following three items apply to 3d views:

Orthographic view: A view in which the design appears rotated with one of its major faces parallel to the view. There are six standard orthographic views: front, top, right side, left side, back, and bottom. These views provide useful schematic representations of a design, but generally more than one such view is necessary to communicate the entire design.

Pictorial view: A view whose orientation is rotated such that none of the major faces are parallel to the view, which is more akin to how we see things in the real world. Unlike orthographic views, these views are often perspective views to increase realism. A special-case pictorial view known as "isometric" is rotated such that 3 sides are equally visible, and is common in traditional drafting because it is easy to draw.

Perspective view: A view can be made to simulate the way we see real objects (and the way a camera sees them) by applying perspective projection. This causes closer objects to appear larger in the view. These views can look more natural and reduce the ambiguity common in 3d wireframe drawings.

Cursor: The onscreen indicator of the position of the pointing device (mouse). Often this is displayed as a small arrow or crosshair (+). The position of this cursor is two-dimensional by its nature. In a 2d CAD program, the cursor position can directly converted into a data point by a straightforward process, using the scale, translation, and orientation of the view. In 3d, however, an infinite number of data points can appear at the exact position of the cursor. Therefore, the software must provide some method for the user to determine the "depth" of the data point, since the cursor position itself is not sufficient to fully determine the data point.

Snap: A common data point input mechanism whereby the user can place the cursor on top of an element and press a special button (on the mouse or the keyboard) to cause the cursor to jump to the closest significant point on the element (endpoint of a line, for instance). This is a simple way of supplying a data point with inherent precision, and, in 3d, a non-ambiguous depth. Variations of the snap allow the user to snap to midpoints or other divisions along the element, points where two elements intersect, or simply the closest point on the element.

The invention has been implemented in a preferred embodiment as an enhancement, called "ModelBox," of the Microstation CAD system, version 4, available from Intergraph Corporation, Huntsville, Ala. 35894-0001, including, but not limited to, the following published documentation: User's Guide, Reference Guide. The enhancement has been implemented using the Microstation Development Environment, also available from Intergraph Corporation, including, but not limited to the following published documentation: MDL Programmer's Guide and MDL Function Reference Manual. The foregoing identified documents are supplied herewith and are hereby incorporated herein by reference. Following is a description of the operation of ModelBox.

VIEW MANIPULATIONS

Rotate view
Shift view
Zoom
Change Perspective Angle

Operating the view manipulations is simple and intuitive. ModelBox provides its own "fit view" command. The command provides extra display depth so that items are not likely to get "clipped" when the view is rotated. The fit view command of ModelBox also centers the active depth within the view so that subsequent rotations work about that depth. Otherwise, objects might spin out of the view. ModelBox will not prompt for the user to select a view if there is only one visible.

The user may start out in the default 3D seed file (the one with the cube with labeled sides), and turn off all views but the iso view. Maximize this view to fill the screen. After fitting the view, one may try using "rotate view". Tap a "from" point anywhere in the view, then drag the cursor about. The rotating cube makes it clear how the view will look when the next point is placed. Notice that the front plane of the cube is shown in bolder lines. Shift view works similarly, except that it moves the view side to side rather than spinning it. Again a "from" and "to" cube are displayed for reference.

Now one may try adjusting the perspective angle with "change perspective angle." Again, one may tap a point anywhere in the view (too close to the center will make it harder to control, however), and move the cursor about. A perspective angle in the range of 35 mm (60 degrees) to 60 mm (40 degrees) is what is considered "normal" in photography. More importantly, the user may set it until it looks right to for himself. This command makes the view much more natural looking and less ambiguous than a non-perspective view.

Zoom view works with the same logic of the other view commands, but it takes an extra data point. First the user must define a "from" cube, and then a "to" cube. By default the "from" cube is centered in the view, but if one snaps to an element, it will center it about that point. One may find a small detail in the view, say a piece of text. Then one can snap to it, then stretch the cube until it appears to enclose the volume of the detail one wants to look at, and tap a data point. Now the "to" cube will be shown (always centered in the view), and one may make it the size one wishes it to be and tap a data point. Similarly, the user can also easily zoom out with this command, just by making the "from" cube big and the "to" cube small.

All four commands, not just zoom, act somewhat differently if one snaps for the first point. They will operate about the depth of that point, rather than the current active depth. They will also set the active depth to pass through that point, so that subsequent manipulations will work about that depth.

DATA POINT INPUT

The data point input system is currently supported by the six modeling and four modification commands described below, but not by built-in MicroStation commands. However, the commands described below are very flexible and have various options so that they cover a wide range of functionality, making them the equivalent of many more MicroStation built-in commands. (Data point input in the 3d mode is described below in the section called "3d input generator".)

The "active depth" no longer applies, and the view's orientation does not affect how geometry is created and manipulated. The user is typically best served with a perspective view that shows three sides approximately equally. The data point input system in accordance with the present invention permits more sensible and controllable dynamics. While this system has considerable sophistication (which is explained below), the user really does not have to know the exact details of what the system is doing, and the dynamics and coordinate readout inform the user of the results of his activity.

If the active depth of native MicroStation does not apply, where do data points go? Of course, if the user snaps or keys in the points, they go where the user puts them. Otherwise they are projected onto to a smart "default plane" (which, as described below, is usually parallel to the primary plane and includes the last point placed) which is similar to the active depth plane of native MicroStation, except for two major differences: Unlike the active depth plane, the default plane of this embodiment does not have to be parallel to the view orientation. Also unlike the active depth, the default plane "follows" the user, so that it passes through the last meaningful point in the command.

As for the orientation of the default plane, it is generally determined by the primary plane, which can either top, front, or side. The user may set the primary plane with the topmost button in the ModelBox dialog box. Notice that the other button, the secondary plane, is greyed out, as it does not yet apply.

There are two cases when the default plane is not determined by the primary plane. The first is if the cursor cannot project to this plane (such as if the system is in a top view but the primary plane is set to front), or if its projection to this plane is a point outside of the display depth. In this case the closest "regular" (i.e. top, front, or side) plane to the view orientation will be used.

The other situation where the primary plane is not used for the default plane is when a particular command has enough information to provide a "better" plane. For instance, the dynamics for the third point of the "arc by center" command will be much more controllable if a default plane is used that includes the first two points; otherwise, not only will the sweep and radius of the arc be manipulated dynamically, but even the actual plane of the arc will be in motion. Of course, if the cursor cannot get to this plane the primary plane or closest regular plane will be used instead.

In addition to its part in determining the orientation of the default plane, the primary plane also supplies its orientation to many commands—those that traditionally looked to the view orientation because the data points themselves do not supply enough information. My versions of such commands as "place circle" and "mirror" base their operation on the primary plane. Again, the idea is to make it possible to work in pictorial views, where it would be nonsensical to mirror an element or place a circle relative to such a view orientation. 3D input generator While the previously described default data point input system makes for controllable dynamics, generally the user needs more precision (unless, of course, there is already a feature one can snap to). With regular MicroStation commands one can key in "d1=" and X, Y and Z values, but this is non-interactive and unforgiving, and certainly does not make the most of dynamics. In other situations the user may have to place a couple lines, extend them to intersection, and then snap to the intersection point. This of course is slow and requires prior planning—the user must do it prior to the command the data point is needed. All these problems and more are addressed by the 3D input system of ModelBox. The system can be called up at the touch of a function key anytime the current command is expecting a data point.

The system is provides a combination of 3D data point, precision key-ins, construction planes, and axis lock, with an informative dynamic box displayed to indicate what it is doing. When in 3d mode, the cursor is always constrained to a plane, and sometimes to a line. The system allows the user to place any number of points to "build" the final data point to be used by the command. There is extensive feedback in terms of dynamics, transient elements, and related characteristics.

There are at any time two planes, or more accurately, orientations, that are being used. One is the primary plane, the other the secondary. The system automatically toggles between the primary and secondary planes each time the user taps a point. Unlike the default plane, keypoint snaps do not override this plane, but simply project onto it.

To enter 3d mode, press the user presses the "3d" function key whenever the command is expecting a data point. For instance, try the "draw line" command. For the first point (the start point) 11 in the line, snap to an existing item, and move the cursor 12 a distance. A line 15 will appear, dynamically spanning the distance from the first point 11 to the crosshair 12 showing the cursor location as shown in FIG. 1. A ModelBox dialogue box 13 shows the front plane (user selected as the primary plane) as active; the secondary plane is not yet available and is therefore greyed out. The current point indicated by the cursor is in a construction plane passing through the last point (which is here the first point) entered and parallel to the active plane. The coordinate readout box 14 is not active yet, nor is the secondary plane.

Figure 2:
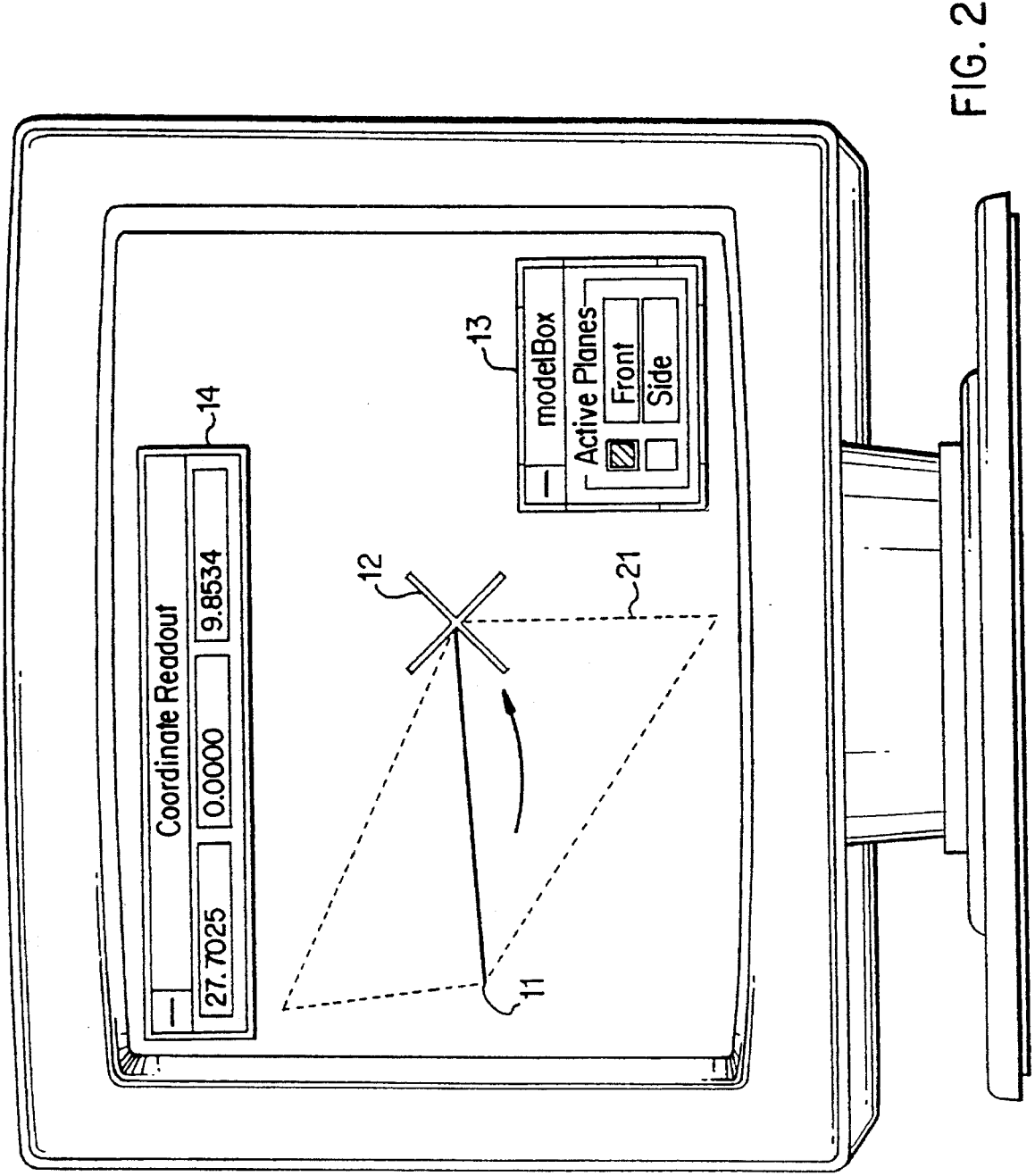
FIG. 2 shows initial operation of the system after activation of the 3D input mode in accordance with a preferred embodiment of the invention.
Figure 3:
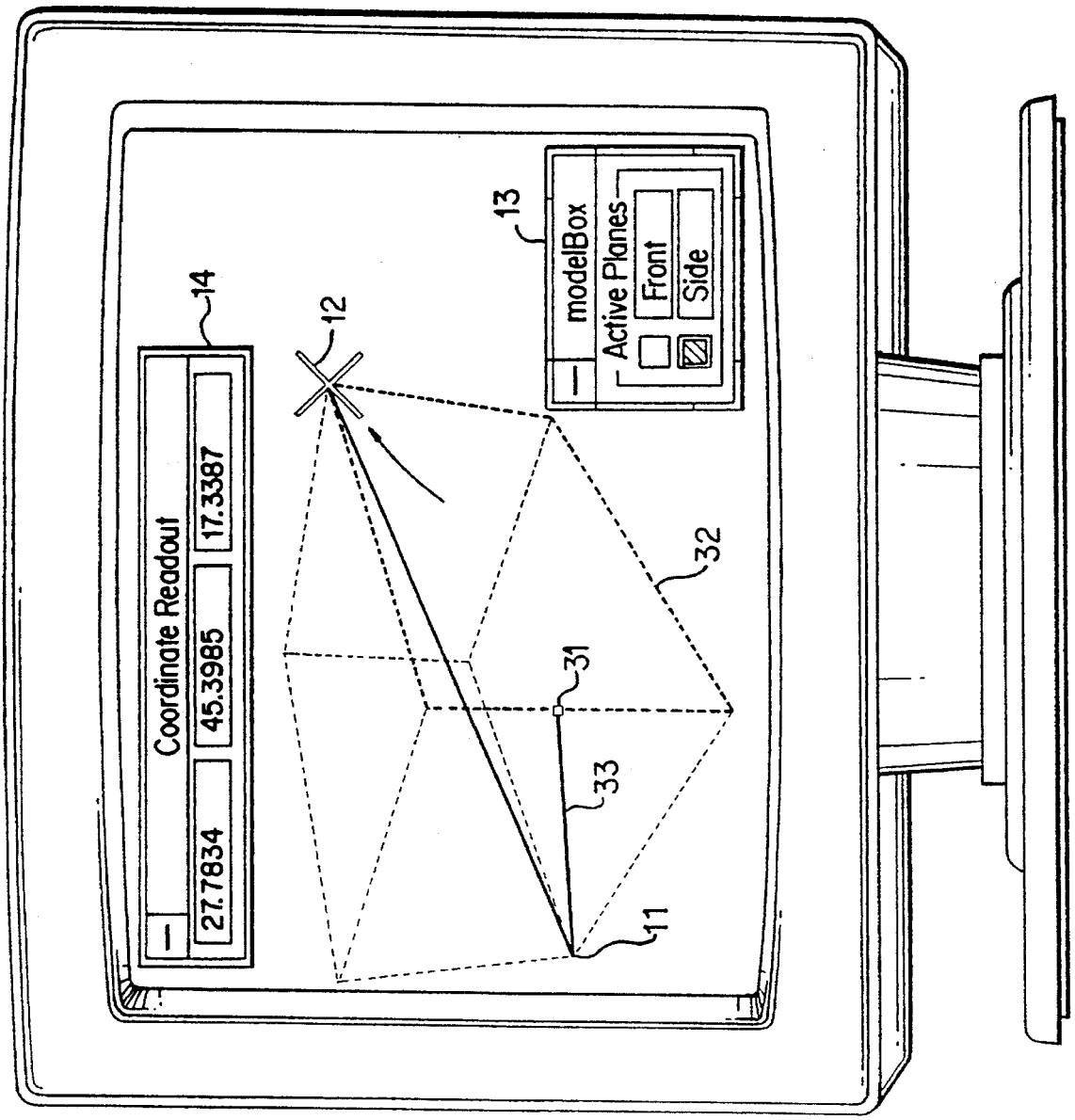
FIG. 3 shows operation of the system, in accordance with the embodiment of FIG. 2, after the tentative point has been relocated from the starting point with the primary plane active.

The 3d mode is entered by pressing the function key labeled "3d". The user will then see a box 21 having one corner at the last point 11 placed and an opposing corner at the cursor 12, as shown in FIG. 2. The box is flat, and parallel to the primary plane. (This box, as will be discussed in connection with FIG. 3, is actually a special case of a parallelepiped, used to show current point location, having no depth.) Although the secondary plane is not yet active, it is available and therefore no longer greyed in the dialogue box 13. The coordinate readout box 14 now shows coordinates of the cursor relative to the start point. Since motion of the cursor is deemed to be in a construction plane parallel to the active front plane, the y coordinate remains at zero.

If the user then taps a data point (by clicking on a button on the mouse), the point will be entered as a tentative point 31, and the active plane will toggle to the secondary plane, as shown in FIG. 3. Now motion of the cursor will be in a construction plane parallel to the secondary plane (the side view as indicated in window 13) but passing through the tentative point 31 that the user tapped. The current point at the cursor location 12 is displayed as at one corner of a rectangular parallelepiped 32 (sometimes referred to as a "box") with the start point 11 at the opposite corner. The parallelepiped has a pair of opposing sides parallel to each of the two orientation planes (primary and secondary), so that the end of the parallelepiped that includes the current point is disposed in the construction plane. The coordinate readout window 14 shows the y and z coordinate fields in motion as the cursor is moved, but the x field is fixed, since the construction plane is now parallel to the side view as the active plane. The side of the parallelepiped that includes the construction plane is highlighted. While the active command, here line draw, causes drawing of a line (in this case) from the start point 11 to the current point indicated by the cursor 12, in accordance with the invention in this embodiment, the effect of the command is also shown with respect to the tentative point 31, and a tentative element (here a line) 33 is also constructed using the start point 11 and the tentative point.

Figure 4:
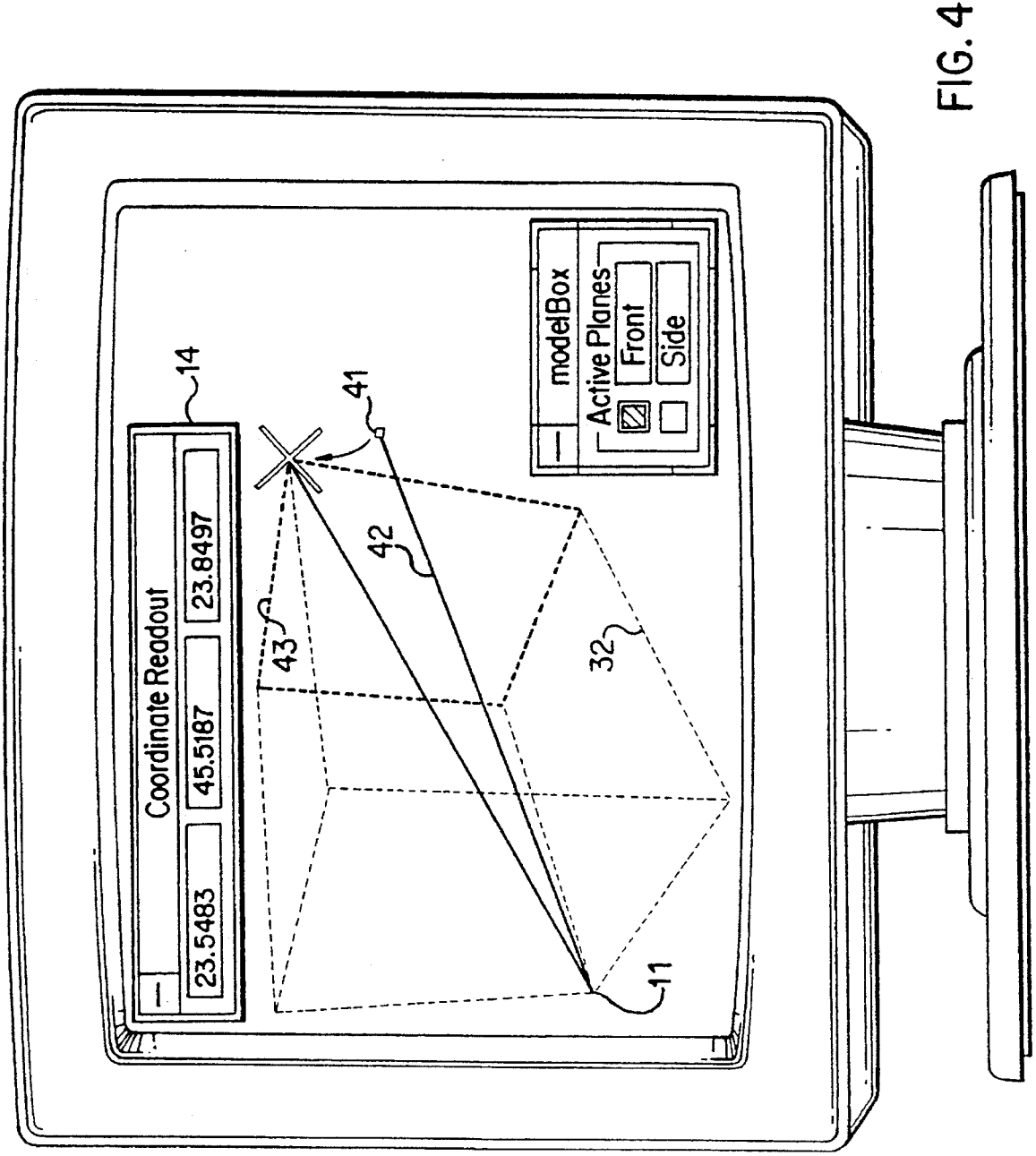
FIG. 4 shows operation of the system, in accordance with the embodiment of FIG. 2, after the tentative point has again been relocated, this time with the secondary plane active.
Figure 5:
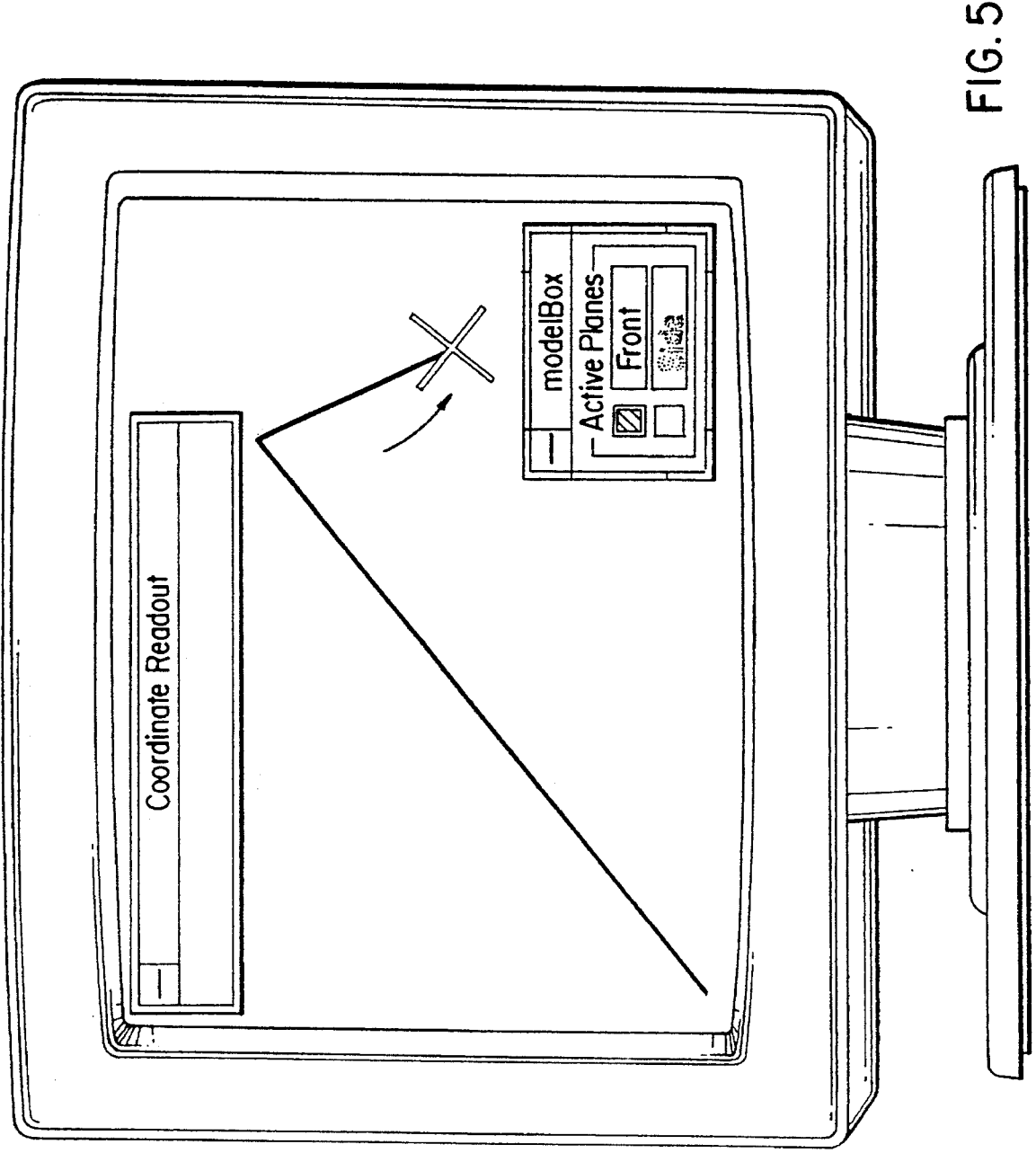
FIG. 5 shows operation of the system, in accordance with the embodiment of FIG. 2, after the tentative point has been converted, on command, to an input point with the 3D input mode having automatically terminated.

The user may continue tapping data points as long as desired, causing the active plane to be toggled with each tap, and a new tentative point to be established as shown in FIG. 4, along with a new tentative element 42. In addition to the indicator in the active plane window 13, the system will shows the user which plane is active by showing that side 43 of the parallelepiped highlighted. If the user places a point he does not like, he may undo it. As shown in FIG. 5, when the user is happy with the position of the tentative point as indicated by the parallelepiped, he may hit ENTER, and the system will then finally select the tentative point, providing it as a data point to the design system, and exit the 3d mode. The data point will be used by the command just as if it had been entered conventionally, and the parallelepiped will go away, as shown in FIG. 5.

In some cases, the system will not immediately go into 3d mode upon pressing the function key, but will prompt for a reference point. This would be true for the first point of a line, for instance, since there is no previous point on which to base the corner of the parallelepiped upon. The user must snap to an item for this point or the system will not accept the point. In cases where it does supply a reference point automatically, the user may have it use a different point by snapping elsewhere prior to pressing the function key to activate 3d mode.

Figure 6:
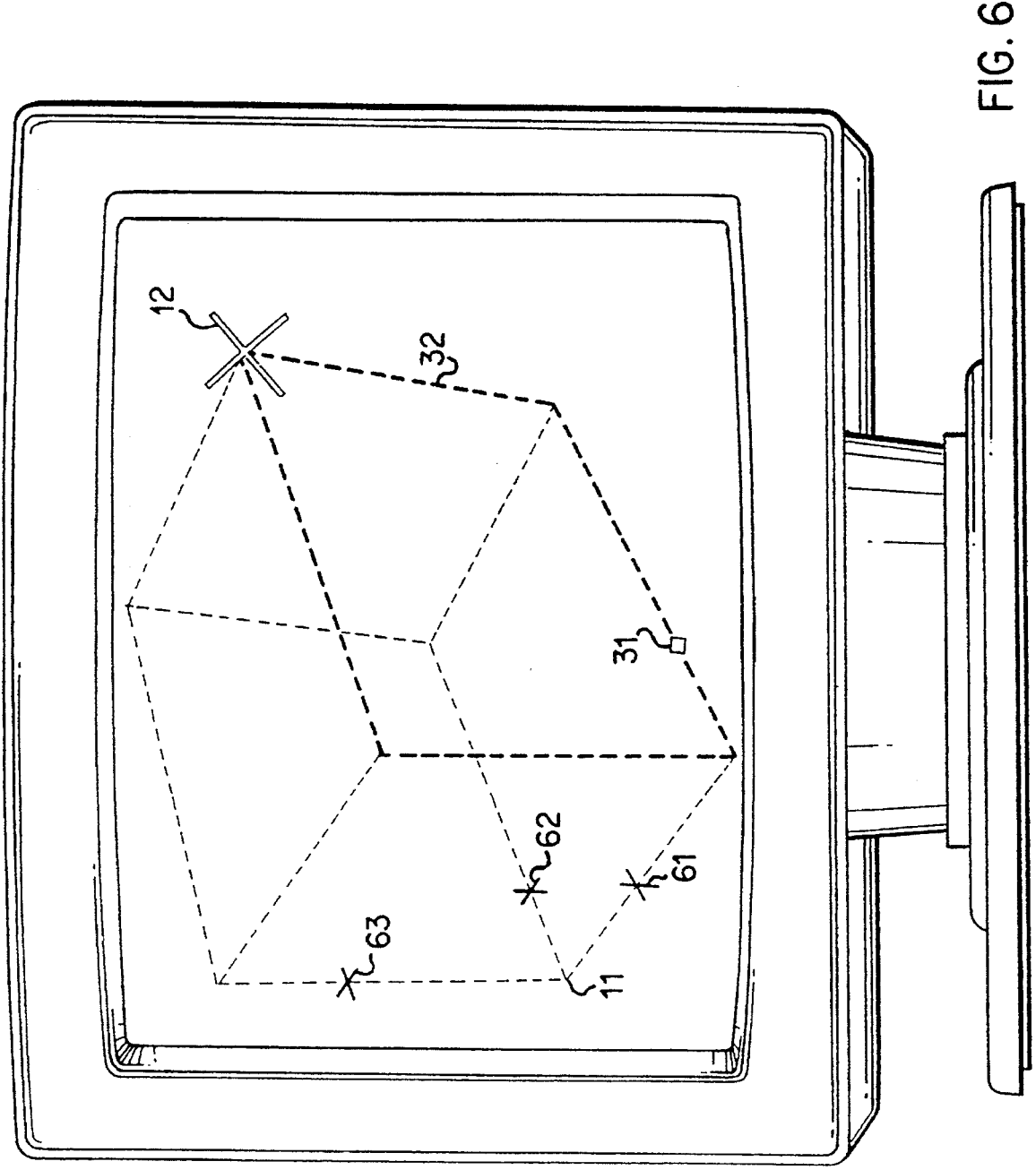
FIG. 6 shows operation of the system, in accordance with the embodiment of FIG. 2, displaying the location of the index point, by reference to coordinates, in a location differing from that of the start point.
Figure 7:
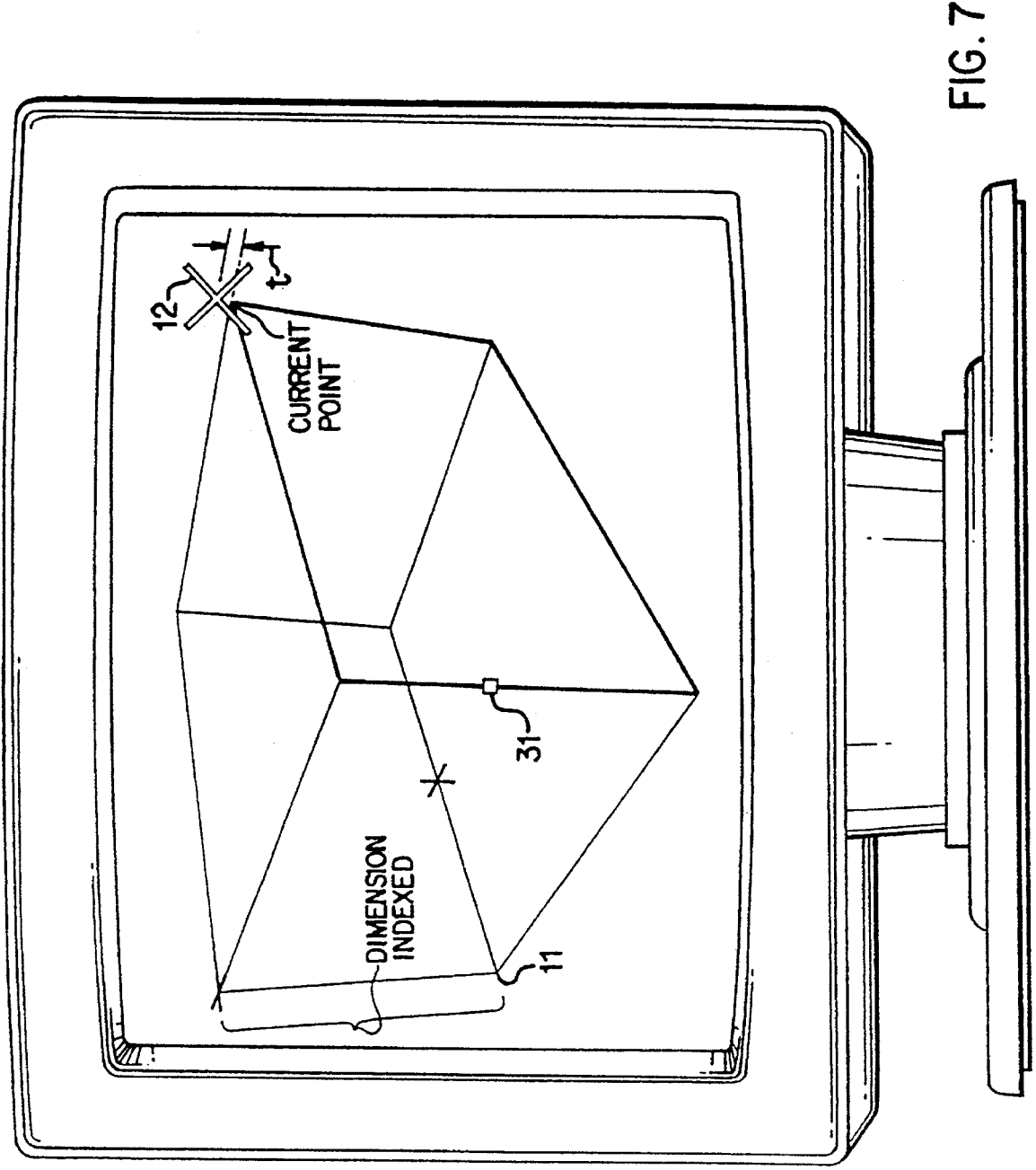
FIG. 7 illustrates operation of the system, in accordance with the embodiment of FIG. 2, when indexing is active in one dimension.

When moving the cursor around when in 3d mode, the current point may be indexed relative to the original box corner (start point). As shown in FIG. 7, if one moves the cursor 12 on top of a line directly horizontal or vertical from the index point, there is a "sweet spot" a few pixels wide (shown as tolerance t) where it will lock into precisely horizontal or vertical. The parallelepiped will light up to indicate that an index has been found. These indices always start out at the parallelepiped corner (start point), and adjust to be at the last precision point (snap or key in) placed. If an index point has moved from the start point to a new location because a precision point has been placed elsewhere, the user will see the new location marked by crosshairs 61, 62, and 63 on the edge of the parallelepiped, as shown in FIG. 6. These crosshairs show the displacement, along each axis of the parallelepiped, of the index point relative to the start point. (Coordinates in the readout box 14 of the prior figures will reflect the distance from the index, not from the original corner of the box.)

Figure 8:
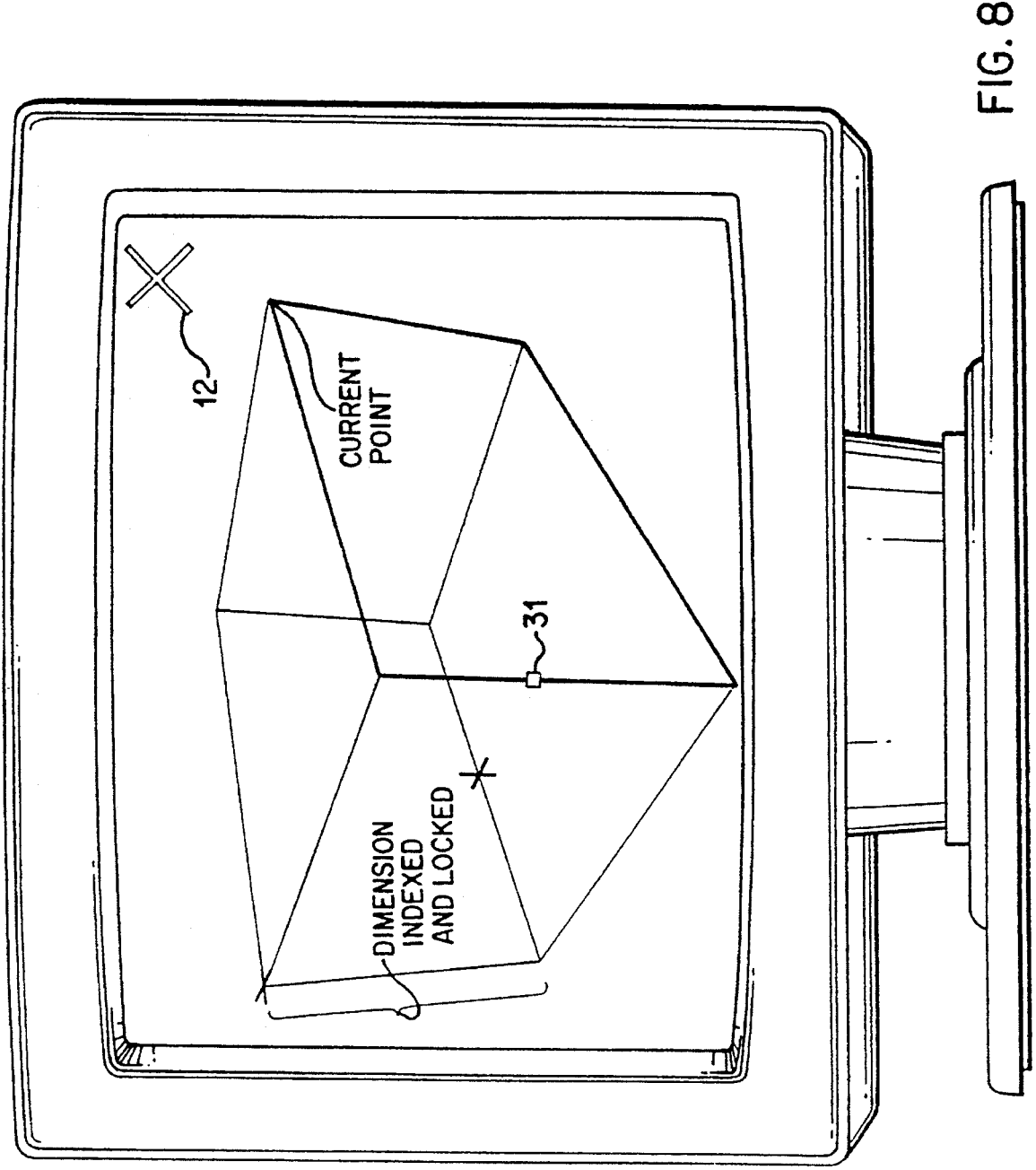
FIG. 8 illustrates operation of the system, in accordance with the embodiment of FIG. 2, when indexing has been lock in one dimension.

When the cursor is on a sweet spot, the user can place a data point with the assurance that it is directly horizontal or vertical from that reference point. As shown in FIG. 8, the user may also lock it with the lock button (which allows the user to not only be sure that the current point is indexed, but also to snap to another item and have the constraint still apply). Pressing the lock button again frees it up.

Finally, keying in a number moves the point toward the cursor that distance (again, based on the index). When keying in numbers, just refer to the coordinate readout box to estimate what to key in to get the results you want. If none of the fields in the box are displayed on black background, the input generator will not accept a key in. A negative key-in will send the point away from the cursor.

Therefore, to work precisely in 3d mode, there are two main ways:

(1) Moving the cursor on top of an index (sweetspot) and keying in a number to represent how far to move towards the cursor. This has the additional effect, as discussed above, of moving the index itself, so that subsequent key ins can be based upon the new locations.

(2) Snapping to existing geometry while constrained to a plane or a line. To constrain motion to a line, one moves the cursor on top of an index and presses the lock button.

These two methods, especially when used in combination, provide substantial "on-the-fly" construction capability.

Auxiliary coordinates

To set up an auxiliary plane, one presses the "Auxiliary Coords" function key. This allows one to snap to 3 points to define an auxiliary plane. One may do this in the middle of a command, even while in 3d mode, and everything one has done so far will be preserved. One may also "undo last data point" within the middle of this command. Accept the plane, and it will automatically make the auxiliary coordinates active.

The plane orientation defined by the user will be considered the "front" view now, rather than the global front view. Of course, the user may switch to "side" or "top" to move in the planes 90 degrees from the one you defined.

Certain commands, such as circle, box, mirror, and scale, are dependant on the active coordinate system. In other words, even if one can get one's data points where one wants them without using an auxiliary system, the command itself needs the auxiliary system to provide the correct orientation.

The user may toggle back and forth between Auxiliary and Global with the option button in the dialog box.

Unit Roundoff

The user can turn this on and off and change its value with the dialogue box. (FIGS. 1–5 were simplified to facilitate discussion, and the ModelBox dialogue box 13 in the actual implementation includes a section permitting the user to turn unit roundoff off and on.) In 3d mode, it will round off x, y and z to the closest unit, relative to the index point. This is overridden by any tentative snap or precision keyin. If the roundoff is larger than several pixels in the current view, the system considers the data point to be a precision point and adjusts the indexes appropriately.

Arcs and circles now support unit roundoff for the radius, while line and linestring support it for length: again, precision input and snaps override, as does 3d input (which of course applies roundoff in its own way). If the user is confused as to what numbers get rounded, he may simply watch the dynamic readout.

The following commands have been developed to work in a compatible manner with the 3d mode described above, since analogous commands in native Microstation are not currently operable.

MODELING COMMANDS

Draw Line

While this command can be used exactly as MicroStation's "Place Line" tool, it will also take a keyin for length. One may also use the last distance (or radius) used by pressing the pushbutton that displays that value. These will lock the length: the user may unlock it if desired by pressing the pushbutton again (which now reads "unlock"). In the absence of other precision (i.e. snaps, precision keyins, 3d input), the length value will be rounded according to the roundoff value (if roundoff is turned on).

Of course, the other major difference between this line command and MicroStation's is that this one supports 3d input.

Draw Linestring

Supports "UNDO LAST DATAPOINT", otherwise known as "Oops" (as do all commands that take more than 2 data points). This command works identically to "Draw Line" in terms of keying in or rounding the length.

Draw Box

By two diagonal points. Will be 2d (i.e. flat) or 3d, depending on where the data points are placed. By default, this will be fully shadable, but you can make it open (on the sides parallel to the primary plane) by toggling the option button from "closed" to "open". If the box is flat, an open box will be a linestring.

Draw Circle

In the same way "Draw line" accepts keyins and rounds the length, "Draw Circle" does for the radius.

Draw Arc by Center

Center, start, then sweep. Will take keyed in radius, use the last radius used (press the radius pushbutton after the center point), the radius as determined by the start point (press it after the start point), or (by default) as determined by the sweep point. Radius will be rounded off as with circle. Toggle the option button to change between small arc (smaller than 180 degrees) and big arc (greater than 180).

Draw Arc by Edge

Endpoints, then edge point. Takes radius key in or the last radius used. Again, the radius can be rounded. Toggle the option button to "semicircle" for the special case 180 degree arc (really handy).

MODIFICATION COMMANDS

General notes: The user can toggle from original to copy within any of these modification commands without letting go of selected elements. One simply uses the option button. If the user has something selected, and picks a different modification command, it will keep that item selected (the user just hits reset if he wants something else).

Although the present implementation does not yet support fences, it does support the selection tool (arrow icon). This Mac-style tool is used as follows: one may pick individual elements, pressing CTRL to select multiple items and, if necessary, snap to items to distinguish them from others. Or one may drag a fence around multiple elements (use "change perspective angle" first to make perspective views non-perspective). If desired, the user may group these selected elements into an "orphan cell" by pressing CTRL-G. Until dropped, they will remain a group.

When items are selected, one can pick the modification command and it will work on that group of elements. Unlike MicroStation commands, the items selected are highlighted.

Move/Copy

Can UNDO to give a different "from" point than the one you picked the element with.

Mirror Original/Copy

Option button allows toggling between horizontal and vertical. Notice that this command is dependant on the primary plane, change from "front" to "side", for instance, if the item is not going in the right direction.

Rotate Original/Copy

By 3 points. Note that the 3 points determine the plane of rotation, similar to the arc by center command. Doesn't yet take an angle keyin, but it will.

Scale Original/Copy

By 3 points. One may use the option button to change between the default variable aspect ratio scaling to one in which the aspect ratio will be preserved. Can key in number for scale factor. When using a variable aspect ratio, it is easy to leave one or two dimensions fixed. For instance, if the user wants to change the height without affecting the length or width, the user simply places the second datapoint directly above or below the first (3d input may be helpful). Then no matter where one places the third point, only the height will change. This is a powerful command, but it takes some time to gain familiarity with it.

MISCELLANEOUS USER INPUT

3D—enters 3d mode. Use this whenever the command is expecting a data point. Once in 3d mode, one can use this button as a shortcut to toggling between the primary and secondary planes without having to tap a data point. (One could also do this with the dialog box by picking one of the toggle buttons next to the primary or secondary planes' option buttons.)

LOCK—locks to an index while in 3d mode. That is, if the cursor is on top of a "sweet spot" one may hit lock and it will stay locked to that axis until one hits lock again, hits a datapoint, or exits 3d mode by hitting reset. This allows one to snap to an element while locked to an axis.

TOGGLE—this is a shortcut to the changing the option button on the command dialog box, such as to toggle between mirroring horizontal and vertical.

ENTER (CARRIAGE RETURN)—pressing the ENTER key on the keyboard is used by ModelBox for several purposes, depending on the context. If one is using the 3d input generator, it is used to finish one's datapoint (since tapping the data button on the mouse only tentatively registers points). It can also be used as a shortcut to pushing the button which locks or unlocks a radius (in the arc and circle commands).

KEYED IN VALUES—if one sees a dynamic readout (such as the x,y,z coordinates in 3d input, or the radius in the arc and circle commands) that is displayed on a black field, that indicates that keying in a number will explicitly set that value. This is described in the part about 3d input and the commands' descriptions. When in 3d input if the cursor falls on a "sweetspot", the dimension that could be keyed in will show up on a black field, and any dynamic readout for one's command (e.g., radius) will no longer be on a black field (since the 3d input will override the arc or circle command). The dynamic coordinate readout fields are not true keyin fields (all keyins go into the command window), but the use of a black field does indicate a sort of "keyboard focus". Because these keyins go into the command window, one can use the MDL application CALCULATE to preprocess keyins. That is, if CALCULATE is loaded, one could key in ((5.25+3.125) / 2) and it will calculate it before sending the number to ModelBox. Note: "Scale" will accept a keyin, but does not yet have dynamic readout. Rotate does not yet accept an angle keyin, but will.

ORIG/COPY TOGGLE—toggle from original to copy within any of the modification commands (move/copy, mirror orig/mirror copy, etc.), right in the middle of the command. One can use the function key as a shortcut to toggling the option button in the dialog box.

UNDO—as mentioned above, one can "undo last datapoint" (shortcut on the PC is ALT-Backspace) on any of the commands that accept more than two datapoints. Further, if one is using 3d input, one can undo one point in the event of a mistake.

TOP—makes the primary plane "top", makes the primary plane active, and shifts the current primary plane orientation to secondary. The user can do this with the dialog box, but the function key method is quicker.

SIDE—see above.
FRONT—see above.
STRUCTURE

The following describes the structure of the ModelBox implementation. of the preferred embodiment of the input system. To facilitate description, it is assumed that a single isometric view is active. Microstation is state driven, allowing a programmer to set up data point, dynamics, reset, and keyin routines to create commands. Tapping the left mouse button with the mouse cursor over a view calls the current data point routine. This routine checks the current position of the mouse cursor, converts it to a 3d point (x, y, and z coordinates), and applies it appropriately. The dynamics routine is called everytime the mouse moves. This routine will, like the data point routine, check the current position of the mouse cursor and convert it to a 3d point. It will then typically display to the screen a preview of what the results of tapping the left button would be. Dynamics routines must remember what they have drawn so they may erase it prior to drawing new items. Tapping the center mouse button while the cursor is on an item in the drawing "snaps" a special crosshair to the closest key point (such as the end point of a line) on that item. To facilitate description, it is assumed that this point is stored in a global variable referred to as snap_point. Another variable, snap_point_active, keeps track of whether a snap crosshair is visible. Both data point and dynamics routines will typically check whether snap_point_active is true, in which case they will use snap_point rather than converting the mouse cursor to a 3d point. In the case of data point routine, the crosshair will be erased and snap_point_active will be set to false, after the data point routine is called. Tapping the right button calls the reset routine, typically used to exit the current operation.

I describe here the process, from activation of the input tool, to its completion, from an internal point of view. The description refers to variables (shown in bold) and routines (shown underlined) which are outlined later in the document.

Upon activation of the input tool (by pressing an on screen "button" pressing a function key on the keyboard, or the like), the following process takes place. If no command is active, or the current command is not expecting a data point, the user should be given an appropriate error message.

Otherwise, the system needs to get a reference point, or starting point (start_point) on which to base the input mechanism. The system uses the following logic to acquire this point. If there is no previous point in the current command, the user should be prompted to enter a reference point. Only precision, i.e. snapped, points can be accepted for start_point. If a point is entered that has not been snapped, alert the user to enter a point by snapping. If there is a previous point in the command, this point will be used as start_point, with one exception. If the user has tentatively snapped to an item in the drawing, the snapped point will be used instead as the reference point.

Upon getting a value for start_point, the point is also copied to two other 3d point variables: index_point, and tentative_point (these points will change before the input tool is completed, however, start_point retains its value throughout). Then, x_index_locked and y_index_locked are set to false, and active_plane is set to primary (active_plane can be explicitly changed to secondary, or back to primary, by the user, with the aid of a dialog box. The variables primary_plane and secondary_plane are up to the user to set to front, top or side, as he desires).

The current command state is remembered, and the following states are then activated. (These main routines call subroutines, which are underline and explained later.)

Dynamic routine
  called every time the mouse is moved.
Constrain to plane
Index in X
Index in Y
Display box
Display command Dynamics
Data point routine
  called when the left mouse button is pressed, or a tentative snap point is accepted.
Constrain to plane
Index in X
Index in Y
Copy current_point to tentative_point.
Update index point
Display transient items
  If active_plane is set to primary, set it to secondary; if secondary, set it to primary.
Numerical keyin routine
  called when the user types in a number, followed by Enter (carriage return).
  If x_indexed or y_indexed is true:
  Adjust the appropriate value (x, y, or z, depending on active_plane) of tentative_point and index_point by the value keyed in, toward the respective value of current_point. In other words, move tentative_point (and index_point) toward the cursor along the indexed axis.
Display transient items (If x_indexed and y_indexed are not true, check if the current command can use the keyed in number. Otherwise, inform user of an invalid keyin)
Lock command routine
  Called when the user presses a special "lock" function key on the keyboard.
  If x_indexed or y_indexed is true:
    Set the appropriate x_indexed_locked or y_index_locked to true (although x_indexed and y_indexed can both be true at once, do not set both locks to true). If a lock is already true, set it to false (unlock it).
  (If x_indexed and y_indexed are not true, alert the user via error message or beep that nothing can be locked)
Reset routine
  called when the right mouse button is pressed.
  Return command to former state (prior to activating input tool), i.e. cancel dynamic box display, etc.
Enter key routine
  called when the Enter key alone is pressed.
  Return command to former state (prior to activating input tool), i.e. cancel dynamic box display, etc. Supply tentative_point to the command, to be used as if supplied as a regular data point.
Variables
  These variables can be created as global variables. 3d point variables: these variables contain x, y, and z values (real, i.e. floating point, values).

| Name | Description |
| --- | --- |
| current_point | The "dynamic" point, moves with the mouse cursor |
| tentative_point | The last point, which will turn into the final data point if an Enter is pressed |
| start_point | The static corner of the box |
| index_point | Contains last precisely supplied values in x, y, |

-continued

| Name | Description |
| --- | --- |
| | and z |

Other variables

| Name | Possible values | Description |
| --- | --- | --- |
| x_indexed | true/false | Current point shares x value with index_poi (in active_plane coordinates) |
| y_indexed | true/false | Current point shares y value with index_poi (in active_plane coordinates) |
| x_index_locked | true/false | Forces x_indexed to be true |
| y_index_locked | true/false | Forces y_indexed to be true |
| active_plane | primary/secondary | Primary or secondary plane being used |
| primary_plane | top/front/side | Main orientation |
| secondary_plane | top/front/side | Swap orientation |

The concept of "plane" as I use it here is different from the strict mathematical definition of a plane. These planes really represent an orientation, such as that of a top, front, or side view. To actually define a drawing plane on which to project a data point, one must also supply a 3d point through which the drawing plane passes. I therefore use tentative_point (the last point placed), combined with the active plane (which simply refers to either the primary or secondary plane), to define the drawing plane.

Also, notice that I refer to the x and y axes of such a plane, indicating the plane represents a full coordinate system. I intend this in the sense of the coordinate system a view might have.

Subroutines

Constrain to plane

Find current_point, as follows. If snap_point_active is true, project snap_point to the closest point on the plane which passes through tentative_point and is parallel to active_plane. If snapped is false, set current_point to the point on that plane which appears at the location of the cursor.

Index in X

If either of the following conditions are true, set x_indexed to true. Otherwise, set it to false.

1. x_index_locked is true.

2. current_point is within a certain screen distance (a few screen pixels) of a line parallel to the x axis of active_plane, and passing through index_point, AND snap_point_active is false.

If x_indexed is true, adjust current_point to the closest position (normal projection) on the line parallel to the x axis of active_plane, and passing through index_point.

Index in Y

If either of the following conditions are true, set y_indexed to true. Otherwise, set it to false.

1. y_index_locked is true.

2. current_point is within a certain screen distance (a few screen pixels) of a line parallel to the y axis of active_plane, and passing through index_point, AND snap_point_active is false.

If y_indexed is true, adjust current_point to the closest position (normal projection) on the line parallel to the y axis of active_plane, and passing through index_point.

Display box (first, erase any previous box)

Find the unique cuboid (i.e. rectangular parallelepiped) with diagonal corners determined by start_point and current_point, and whose edges run parallel to the x, y, and z axes of the current coordinate system. Display to the screen the twelve line segments representing the edges of the cuboid. The four line segments which lie on the plane which passes through current_point and is parallel to active_plane, should be displayed bolder than the others to indicate the plane of cursor motion.

Finally, if either x_indexed or y_indexed is true, all line segments should be displayed bolder than normal. All items displayed should be remembered so they may be erased. Note: the cuboid will sometimes appear as a flat rectangle, or even a line, depending on the relationship of start_point to current_point.

Update Index Point

If snap_point_active is true, copy the two values that have been manipulated (x and y, x and z, or y and z, depending on active_plane) of current_point to those of index_point (This effectively maintains index_point as storing the most recent values of x, y, and z that were supplied precisely).

Display transient items (first, erase previous transient items)

Display to the screen a bold point at tentative_point.

Display to the screen three small crosshairs, at points closest (normal projection) to the index_point on each of the lines parallel to the x, y, and z axes and passing through start_point.

If the current command displays dynamics (rubberbanding), display any elements, colored gray, based on tentative_point, All items displayed should be remembered so they may be erased later.

Display Command Dynamics (first, erase any previous dynamics)

If the current command displays dynamics (rubberbanding), display any elements, based on current_point. If the command has no dynamics at this point in the command, simply display a bold point at current_point. Remember these elements so they may be erased.

Extensions:

These few extensions to the system will increase its power and usability. I choose to describe these here, rather than above, simply for clarity.

Auxiliary coordinate systems:

The whole system can easily work in a user defined rotated system. Front, top and side will then be interpreted relative to this rotated system.

Roundoff:

The user should be able to set a roundoff value, which rounds all x, y, and z values relative to index_point. Snaps should override the roundoff.

Coordinate readout:

An x, y, z coordinate readout can dynamically show distances relative to index_point. It will also highlight any "indexed" values to show where a keyin will be interpreted.

What is claimed is:

1. A system, for providing input data establishing where data points are located in a model space represented in a view on a two-dimensional display, comprising:

(a) pointing means for moving a cursor over a two-dimensional region of the display and for establishing a location of the cursor on the display;

(b) orientation means for establishing in the model space, primary and secondary orientation planes, of which one plane is currently active at any given time;

(c) means for providing an initial value of a tentative point in the model space as a start point;

(d) dynamic means for establishing a current point in a construction plane, parallel to the active plane, in which construction plane the tentative point is located, in such a manner that movement of the cursor on the display invariably corresponds to two-dimensional movement of the current point in the construction plane and the location of the cursor on the display of the view identifies the current point in the construction plane;

(e) tentative selection means for copying, on command, the current point data to the tentative point data; and (f) final selection means for providing, on command, input point data using the data of the tentative point.

2. A system according to claim 1, further comprising:

(g) means for displaying the current point in the view as at a first corner of a parallelepiped, the opposing corner of which is the start point, and having a pair of opposing sides parallel to each of the two orientation planes, so that the end including the current point is disposed in the construction plane.

3. A system according to claim 1, further comprising:

automatic toggling means for toggling the active plane from one of the primary and secondary planes to the other of such planes upon activation of the tentative selection means.

4. A system according to claim 2, further comprising (h) means for highlighting the side of the rectangular parallelepiped disposed in the construction plane to show the location of the construction plane.

5. A system according to claim 1, wherein the orientation planes are othogonal and the dynamic means includes means for establishing the current point in the location fixed by the position of the cursor on the display of the view, unless the system is in a precision snap mode permitting entry of a percision point, in which case the current point is defined by a normal projection of the precision point onto the construction plane.

6. A system according to claim 1, further comprising:

indexing means for forcing the current point to have one coordinate value identical to the value of the corresponding coordinate of an index point if the current point's non-forced value of such coordinate falls within a specified limit of the value of the index coordinate.

7. A system according to claim 6, further comprising:

means for displaying the current point in the view as at the corner of a parallelepiped, the opposing corner of which is the start point, and having a pair of opposing sides parallel to each of the two orientation planes, so that the end including the current point is disposed in the construction plane.

8. A system according to claim 7, further comprising:

means for highlighting the parallelepiped when the indexing means is active.

9. A system according to claim 1, further comprising means for displaying coordinates of the current point.

10. A system according to claim 6, further comprising means for displaying coordinates of the current point.

11. A system according to claim 10, further comprising means for highlighting the non-forced coordinate when the indexing means is active.

12. A system according to claim 6, further comprising:

index locking means for forcing the current point to have one coordinate value identical to the value of the corresponding coordinate of an index point regardless of the current point's non-forced value of such coordinate.

13. A system according to claim 6, further comprising:

means for assigning initial coordinates of the index point to coincide with those of the start point.

14. A system according to claim 13, further comprising:

means for causing the system to operate in a precision snap mode;

means for determining coordinate values of the tentative point when the system is operating in the precision snap mode; and means for reassigning to the index point any coordinate values of the tentative point that had been determined in the precision snap mode.

15. A system according to claim 6, further comprising:

keyboard entry means for incrementing the value of the non-forced coordinate of the tentative point, when the indexing means is active, by an amount entered on a keyboard.

16. A system according to claim 15, further comprising:

means for reassigning to the index point any coordinate value of the tentative point that has been incremented by the keyboard entry means.

17. A system according to claim 16, further comprising:

index locking means for forcing the current point to have one coordinate value identical to the value of the corresponding coordinate of an index point regardless of the current point's non-forced value of such coordinate;

means for assigning initial coordinates of the index point to coincide with those of the start point; and means for reassigning to the index point any coordinate values of the tentative point that had been determined in the precision snap mode.

18. A system according to claim 1, further comprising:

means for displaying in the view the location of the tentative point.

19. A system according to claim 18, wherein the system is of the type permitting the execution of drawing commands associated with the location of the current point in the model space and the display of the effect of the command that is active with respect to the current point, further comprising:

means for displaying the effect of the drawing command with respect to the tentative point.

20. A system according to claim 6, further comprising:

index display means for displaying in the view the location of the index point.

21. A system according to claim 20, wherein (i) a coordinate system defines the orientation planes and (ii) the index display means includes means for displaying separately, along three hypothetical lines, each line intersecting the starting point and lying parallel to one of the axes of the coordinate system, any displacement of the index point from the start point.

* * * * *

UNITED STATES PATENT AND TRADEMARK OFFICE
CERTIFICATE OF CORRECTION

PATENT NO. : 5,461,709
DATED : October 24, 1995
INVENTOR(S) : Brown

It is certified that error appears in the above-indentified patent and that said Letters Patent is hereby corrected as shown below:

Column 17, line 32, please insert --:-- after "comprising".

Column 17, line 37, "othogonal" should be --orthogonal--.

Column 17, line 41, "percision" should be --precision--.

Signed and Sealed this

Eleventh Day of June, 1996

Attest:

BRUCE LEHMAN

*Attesting Officer*     *Commissioner of Patents and Trademarks*